United States Patent [19]

Hirano et al.

[11] Patent Number: 4,702,705
[45] Date of Patent: Oct. 27, 1987

[54] STEERING WHEEL

[75] Inventors: Atsuo Hirano; Tetsushi Hiramitsu; Satoshi Ohno, all of Aichi, Japan

[73] Assignee: Toyoda Gosei Co., Ltd., Nishikasugai, Japan

[21] Appl. No.: 901,393

[22] Filed: Aug. 28, 1986

[30] Foreign Application Priority Data

Aug. 28, 1985 [JP] Japan .................................. 60-190346
Aug. 30, 1985 [JP] Japan .................................. 60-192564

[51] Int. Cl.4 ...................... H01R 39/08; H01R 39/22
[52] U.S. Cl. .......................................... 439/15; 439/22
[58] Field of Search ............. 339/3 R, 3 S, 5 M, 8 R, 339/118 R; 180/78; 310/228; 307/10 R

[56] References Cited

U.S. PATENT DOCUMENTS

| | | | |
|---|---|---|---|
| 4,055,375 | 10/1977 | Ogawa et al. | 339/3 R X |
| 4,630,501 | 12/1986 | Kubota et al. | 339/3 S X |
| 4,633,731 | 1/1987 | Kurata | 339/3 S X |
| 4,635,029 | 1/1987 | Yamada | 339/3 S X |

Primary Examiner—Eugene F. Desmond
Attorney, Agent, or Firm—Cushman, Darby & Cushman

[57] ABSTRACT

A steering wheel equipped with an electrical relay means is disclosed. The steering wheel includes a pad side unrotatable member and a column side unrotatable member. A boss extends centrally and at least one pad side slip ring is disposed concentrically with the boss and electrically insulated from an outer surface thereof. The slip ring is positioned below the pad side unrotatable member. Further, at least one column side slip ring is disposed concentrically with the boss, and positioned above the column side unrotatable member. A boss plate is disposed around the boss and at least one holder is fixed to the boss plate. Pad and column side contact pins are supported by the holder, and biased toward opposite direction to each other by a spring positioned inside the holder. A lubricant is filled in the holder, and is applied to the slip rings through axial bores formed in the pins. In another embodiment of the invention, two pins are in sliding contact with a single slip ring. The pins having sliding contact portions in contact with the ring in which sliding loci of the pins are different from each other in radial direction of the ring.

6 Claims, 12 Drawing Figures

STEERING WHEEL

BACKGROUND OF THE INVENTION

This invention relates to a steering wheel installed in a vehicle such as an automobile and more particularly to a steering wheel equipped with a relay component comprising slip rings and contact pins.

There is a known steering wheel equipped with a relay component and more specifically an early publication of Japanese Patent Application (OPI) No. 95232/82 discloses a steering wheel with a pad of unrotatable type.

In a steering wheel so arranged as shown in FIGS. 1 and 2, a pad side sun gear 53a and a column side sun gear 53b are respectively installed in the upper and lower portions or the outer periphery of a boss 52 fixed to the upper end of a steering shaft 51, both sun gears 53a, 53b being concentric with the steering shaft 51.

A pad side planet gear 55a and a column side planet gear 55b are assembled to a boss plate 54 extending outwardly from the outer periphery of the center of the boss 52 in between the sun gears 53a, 53b. The planetary gears 55a and 55b are engaged with the sun gears 53a, 53b while rotating on their own axes and moving around the sun gears 53a, 53b, respectively. A planet gear mechanism is thus constructed.

Various kinds of electronic equipment 60 such as a control switch are installed on the pad 56 of the steering wheel and a relay component for supplying power to the electronic equipment is incorporated in the planet gear mechanism.

The relay component is normally installed on the under surface of the pad side sun gear 53a and comprises a pad side slip ring 57a having its surface coated with grease G as a lubricant, a plurality of pad side contact pins 58a, each being fixed to the boss plate 54 through a contact pin holder 59 in such a manner as to contact the surface of the slip ring 57a, column side slip ring 57b installed on top of the column side sun gear 53b and having its surface coated with grease G, and a plurality of pad side contact pins 58b, each being fixed to the boss plate 54 through the contact pin holder 59 in such a manner as to contact the surface of the slip ring 57b.

As shown in FIG. 2, the contact pin holder 59 includes two subdivided pieces 59c and 59d constituting a cylindrical body having a discoidal top cover 59a and a discoidal bottom cover 59b, a through-hole 61 being in the centers of both covers 59a and 59b.

Ends of each of the contact pins 58a, 58b serve as contact pieces 64a, 64b in contact with the slip rings 57a, 57b. The end portions 64a, 64b pass through the holes 61 formed in the top cover 59a and the bottom cover 59b and extend outwardly therefrom.

Both ends of a spring 62 are respectively fitted to the base portions of the contact pins 58a, 58b, the contact pins 58a, 58b being biased by the spring 62 in the direction opposite to each other.

In the steering wheel thus constructed, the pad side and column side slip rings 57a, 57b and the pad side and column side contact pins 58a, 58b are caused to keep sliding contacts through the steering operation and thus the pad and column sides are in electrical conduction.

Two pairs of contact pins 58a, 58b arranged electrically in parallel can be used in order to improve reliability.

In the steering wheel thus constructed, the relay component including, in combination, the pad side contact pin 58a, the pad side contact pin 58b, the contact pin holder 59 and the spring 62 has provided the following problems:

That is, during steering operation in FIG. 1, upon rotation of the steering ring 63, the boss plate 54 is rotated, so that the pad side contact pin 58a and the column side contact pin 58b are rotated about the shaft 51 in sliding contact with the pad side slip ring 57a and the column side slip ring 57b, those rings being kept unrotatable. In this case, the inclinations of the two contact pins 58a, 58b change as if the front ends thereof were dragged each time the direction of rotation changes, and this causes the front ends thereof to catch the slip rings 57a, 57b and thus the contact pins 58a, 58b to rattle.

The above rattling provides generation of unusual sounds and causes the defective connection between the two contact pins 58a, 58b and the spring 62.

Further, since the contact pins 58a, 58b each are kept in contact with the slip rings 57a, 57b as set forth above, the contact pins 58a, 58b always pass on the same loci of sliding revolutions on the slip rings 57a, 57b, respectively. In consequence, only the contacting faces of them will wear out if they are repeatedly used and their durability has posed a problem. This problem becomes conspicuous when two pairs of contact pins 58a, 58b are installed. Another problem is that, when grease G is applied to the surfaces of the slip rings 57a, 57b, the grease G applied onto the loci may be scraped off or driven to both edge portions by the contact pins 58a, 58b and the surfaces of the slip rings 57a, 57b on the loci may be exposed.

Accordingly, unusual sounds originated in the direct contacts of the slip rings 57a, 57b with the contact pins 58a, 58b give the driver an unpleasant feeling during the steering operation. Moreover, the contact pins 58a, 58b are unable to slide smoothly, and contact pins 58a, 58b and the slip rings 57a, 57b quickly wear out.

SUMMARY OF THE INVENTION

It is therefore an object of the present invention to overcome the above-described drawbacks and disadvantages, and to provide an improved steering wheel device.

Another object of the present invention is to provide such a steering wheel device capable of providing smooth sliding contact between contact pins and slip rings.

Still another object of the invention is to provide such a device in which lubricant continuously exists at the sliding contact portions between the pins and rings.

Still another object of the invention is to provide such a device in which uniform wearing results at the entire surface of the slip rings.

Still another object of the invention is to provide such a device in which lubricant is uniformly distributed over the entire surface of the slip rings.

These and other objects of the invention will be attained by providing the steering wheel in which a pad side contact pin in contact with a pad side slip ring fixed to the underside of a pad side unrotatable member and a column side contact pin in contact with a column side slip ring fixed to the upper side of a column side unrotatable member are vertically lined up through a spring. These pins and spring are contained in a cylindrical contact pin holder together with a lubricant. The contact pin holder is fixed to a boss plate.

Since the pad side contact pin and the column side contact pin respectively biased by the spring in the directions opposite to each other are contained in the cylindrical contact pin holder together with the lubricant, the lubricant is allowed to be circulated within the contact pin holder and is entered between the contact pin holder and the contact pin or between the contact pin and the spring. In consequence, the lubricating action therebetween is maintained, while the vibration of the contact pin is absorbed.

According to another embodiment of the invention, at least two contact pins contact at least one slip ring installed on the outer periphery of a boss, the slip ring being electrically insulated from and concentric with the boss. There is adopted a means for changing the loci of sliding revolutions of the contact pins relative to the slip ring in the radial direction of the slip ring.

Further, in the present invention, at least two contact pins contact at least one slip ring installed on the outer periphery of a boss and having its surface coated with a lubricant. The at least two contact pins have contact portions having contact surface shape different from each other. The leading contact pin moves the lubricant on the slip ring, and the trailing contact pin moves back the lubricant. The sliding locus of the leading contact pin is different from that of the trailing contact pin in radial direction of the slip ring to move the lubricant. The slip ring is insulated from and concentric with the boss and there is adopted a means for changing the loci of sliding revolutions of the contact pins relative to the slip ring in the radial direction of the slip ring.

In the first place according to the present invention, at least one of the two contact pins contacting the surface of the slip ring has a locus of sliding revolution in the central portion of the slip ring and the other has a locus of sliding revolution in both radial edge portions thereof. Consequently, the whole surface of the slip ring is worn out uniformly. If two pairs of contact pins are installed to increase reliability, durability is improved as compared with the conventional construction.

In the second place according to the present invention, although the lubricant applied to the surface of the slip ring is scraped in the center portion and driven to both edges thereof, the lubricant on the edges is again repeatedly driven back to the center portion thereof. Consequently, the lubricant is prevented from running out of the surface of the slip ring on both loci of contacts and the slip ring and contact pins are thus kept in contact with each other smoothly.

DETAILED DESCRIPTION OF THE PREFERRED EMBODIMENTS

A first embodiment of this invention will be described with reference to FIGS. 3-5.

Figure 3:
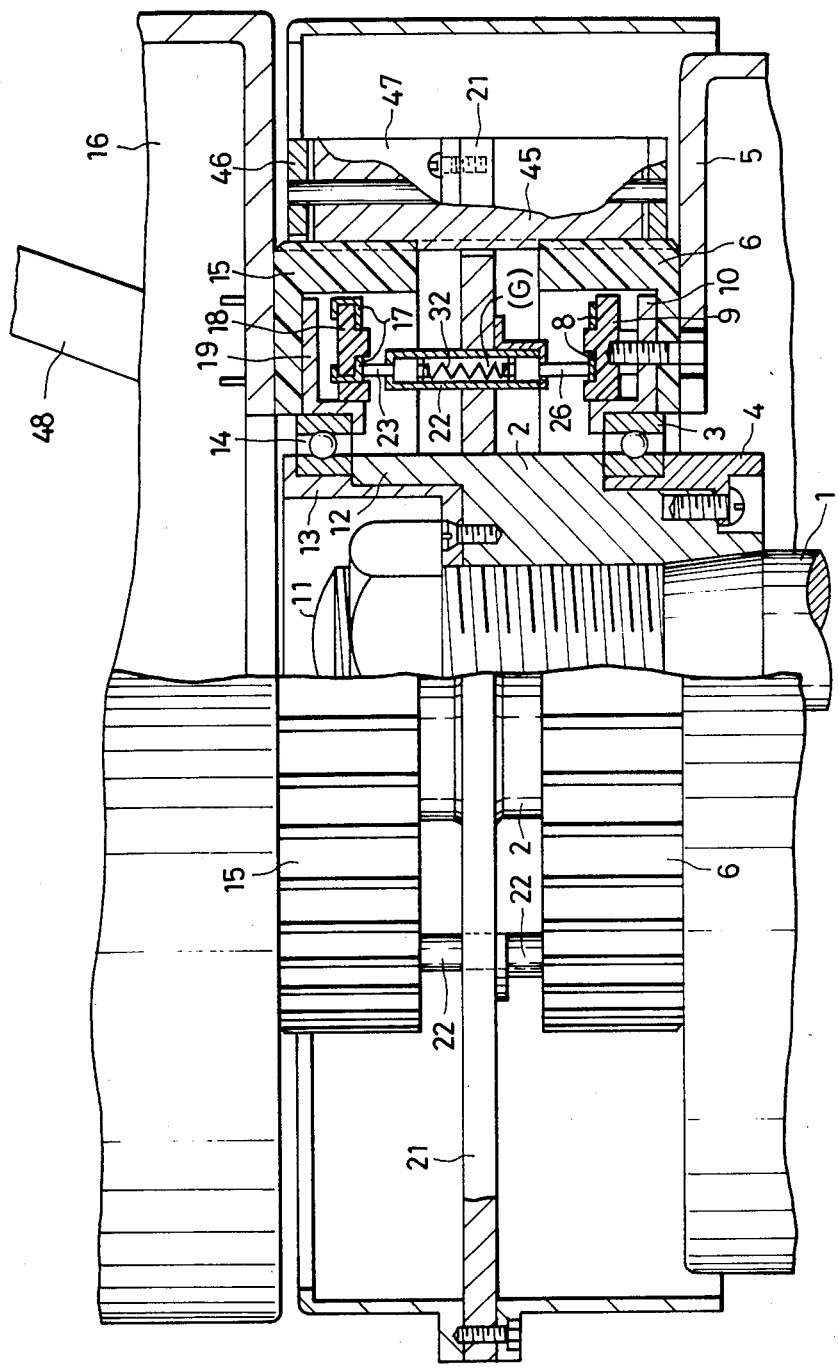
FIG. 3 is a side view partly in cross-section showing a steering wheel device according to a first embodiment of the invention.
Figure 4:
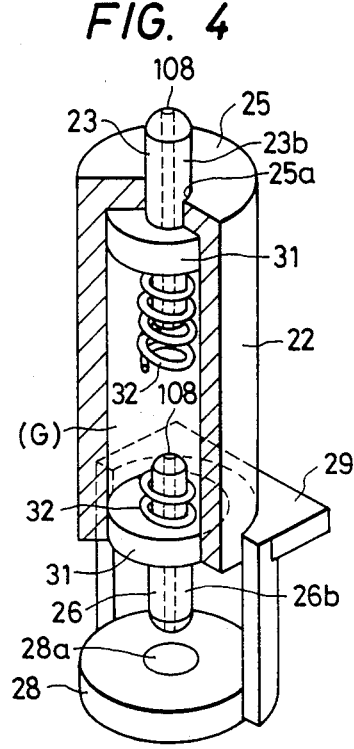
FIG. 4 is a perspective view partially cut away showing pad and column side contact pins and a contact pin holder according to the first embodiment.

As shown in FIG. 3, a bottom bearing 3 is fixed by a lower inside housing 4 to the lower outer periphery of a boss 2 fixed to the front end of a sterring shaft 1.

A column side sun gear 6 as an unrotatable member, which is concentric with the steering shaft 1, is arranged and fixed onto a column 5 on the outer periphery of the lower inside housing 4.

A lower outside housing 10 for use in sandwiching the bottom bearing 3 in between the lower inside housing 4 and the lower outside housing 10 and supporting two column side slip rings 8 through a lower plastic plate support 9 is fixed to the inner face of the column side sun gear 6 on the outer periphery of the lower inside housing 4.

A recess 12 in which a nut 11 for fixing a boss 2 to the steering shaft 1 is arranged therein is formed above the boss 2, whereas central portion of an upper inside housing 13 is fitted into the recess 12, and a top bearing 14 is fixedly secured by the housing 13 and the boss 2.

A pad side sun gear 15 as an unrotatable member. which is concentric with the steering shaft 1, is arranged and fixed to the outer periphery of the top bearing 14 and a pad 16 is attached onto the pad side sun gear 15.

Figure 1:
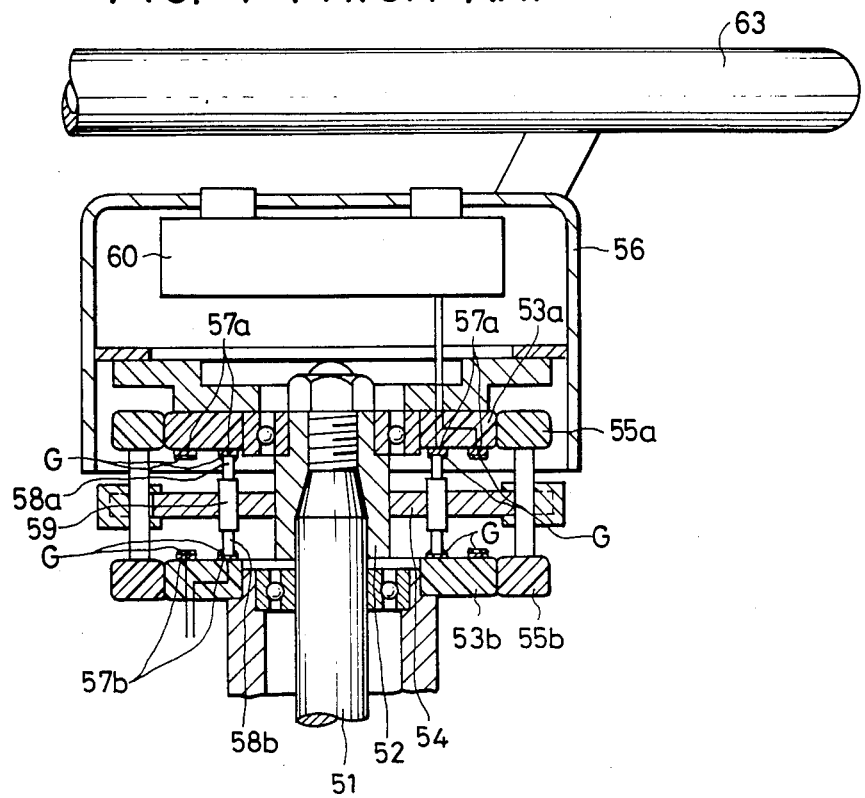
FIG. 1 is a view partly in cross-section showing a conventional steering wheel.
Figure 2:
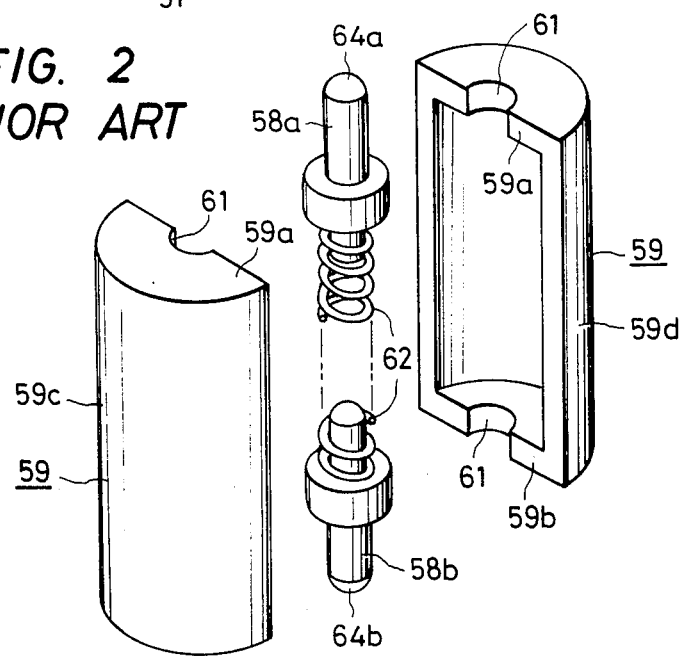
FIG. 2 is an exploded perspective view showing an electrical relay component used in the conventional steering wheel shown in FIG. 1.

An upper outside housing 19 for sandwiching the top bearing 14 in between the upper inside housing 13 and the upper outside housing 19 and intermittently supporting (consequently, the relevant portion in FIG. 2 is left blank) two pad side slip rings 17 through an upper plastic plate support 18 is fixed to the inner face of the pad side sun gear 15 on the outer periphery of the upper inside housing 13. A boss plate 21 is fixedly welded to the outer periphery of the center of the boss 2 and extending radially outwardly from the boss 2.

One cylindrical contact pin holder 22 is fixed to the boss plate 21 at the position where the pair of the pad side slip ring 17 and the column side slip ring 8 are located opposite to each other. According to this embodiment, two contact pin holders 22 in total are installed. The contact pin holder 22, as shown in FIG. 4, a cylindrical body provided with a top cover 25 having a top through-hole 25a in the center thereof through which the front end 28b of the pad side contact pin 23 is allowed to pass and a bottom cover 28 having a bottom through-hole 28a in the center thereof through which the front end 26b of the column side contact pin 26 is allowed to pass. The bottom cover 28 is fixed to the boss plate 21 through a support body 29, so that the contact pin holder 22 is supported by the boss plate 21.

Figure 5:
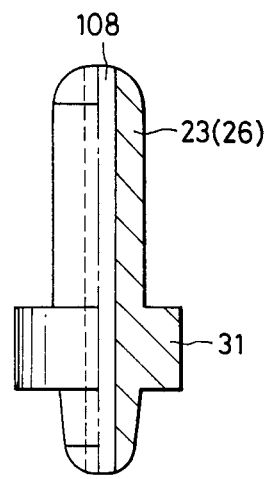
FIG. 5 is a cross-sectional view showing pad side or column side contact pin.

As shown in FIG. 5, both contact pins 23, 26 are generally cylindrical in shape, and collar-like projections 31 are provided at a position offset from an axial center of the pin. The collar-like projections 31 are, as shown in FIG. 4, contained in the contact pin holder 22 and function as stopper means preventing the pad side contact pin 23 or the column side contact pin 26 from springing out of the contact pin holder 22.

Holes 108 having a cross section so small as to allow grease G as a lubricant to seep therefrom are formed in longitudinal direction and at the centers of the two contact pins 23, 26, respectively.

The ends of the conductive spring 32 are extrapolated between the pad side contact pin 23 and the column side contact pin 26 for electrical connection therebetween, whereas the contact pins 23, 26 are biased in the directions opposite to each other by the spring 32.

For assembly, the pad side contact pin 23 is first inserted into the body of contact pin holder 22 with the collar-like projection 31 being placed beneath the top cover 25. Then, the spring 32 is inserted and grease is filled in the body of the holder 22. Thereafter, the column side contact pin 26 is inserted into the holder 22 in the direction reverse with respect to that shown in FIG. 5, and then the bottom cover 28 is fited to the holder body.

Electrically conductive grease G blended with fine aluminum powder is used.

Moreover, the outer periphery of the boss plate 21 is fitted with a planet gear 45 as an unrotatable member simultaneously engaging with the pad side sun gear 15 and the column side sun gear 6 through a bearing 46 and a bearing support member 47, and a spoke 48 for supporting a ring means (not shown) is attached to a portion different from the one where the planet gear 45 is installed.

The steering wheel thus constructed is operated as follows:

Since the pad side contact pin 23 and the column side contact pin 26 are biased by the spring in the directions opposite to each other in the contact pin holder 22, the front ends of the two contact pins 23, 26 respectively contact the corresponding pad side slip ring 17 and the column side slip ring 8 which are kept unrotatable.

As the steering operation is performed, the boss plate 21 rotates, so that the pad side contact pin 23 and the column side contact pin within the contact pin holder 22 are also rotated. Since the contact pin holder 22 is filled with the grease F, the two contact pins 23, 26 are allowed to readily follow the inner peripheral surface of the contact pin holder 22 or the uneven faces of the pad side slip ring 17 and the column side slip ring 8.

In consequence, the two contact pins 23, 26 are prevented from scratching the contact pin holder 22 and unusual sounds are not generated. Assuming that slight scratching remains thus causing the two contact pins 23, 26 to vibrate, the grease G will act to absorb the vibration.

As the grease G has been applied to the contacting faces of the spring 32 and the pad side contact pin 23 or the column side contact pin 26, both contact smoothly without unusual sounds. Supposing such sounds are slightly produced, they will be absorbed by the grease G.

Further, since the grease G according to this embodiment is blended with aluminum, voltage drops in the corresponding contacting portions of the pad side contact pin 23 and the column side contact pin 26 are suppressed.

Furthermore, the holes 108 through which the grease G seeps out are bored in the contact pins 23, 26 and the grease G is consequently supplied to the pad side slip ring 17 and the column side slip ring 8 to make both contact pins 23, 26 smoothly contact both slip rings 17, 8 and minimize the wear of the sliding ends thereof.

Figure 6:
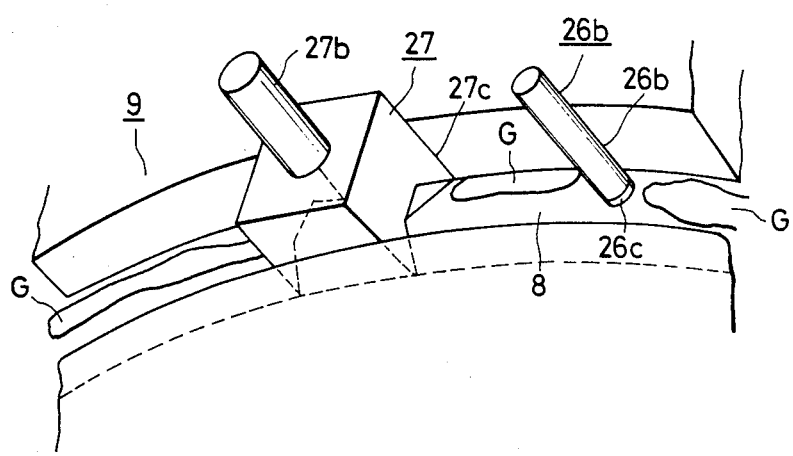
FIG. 6 is a partial perspective view according to a second embodiment of the present invention.
Figure 7:
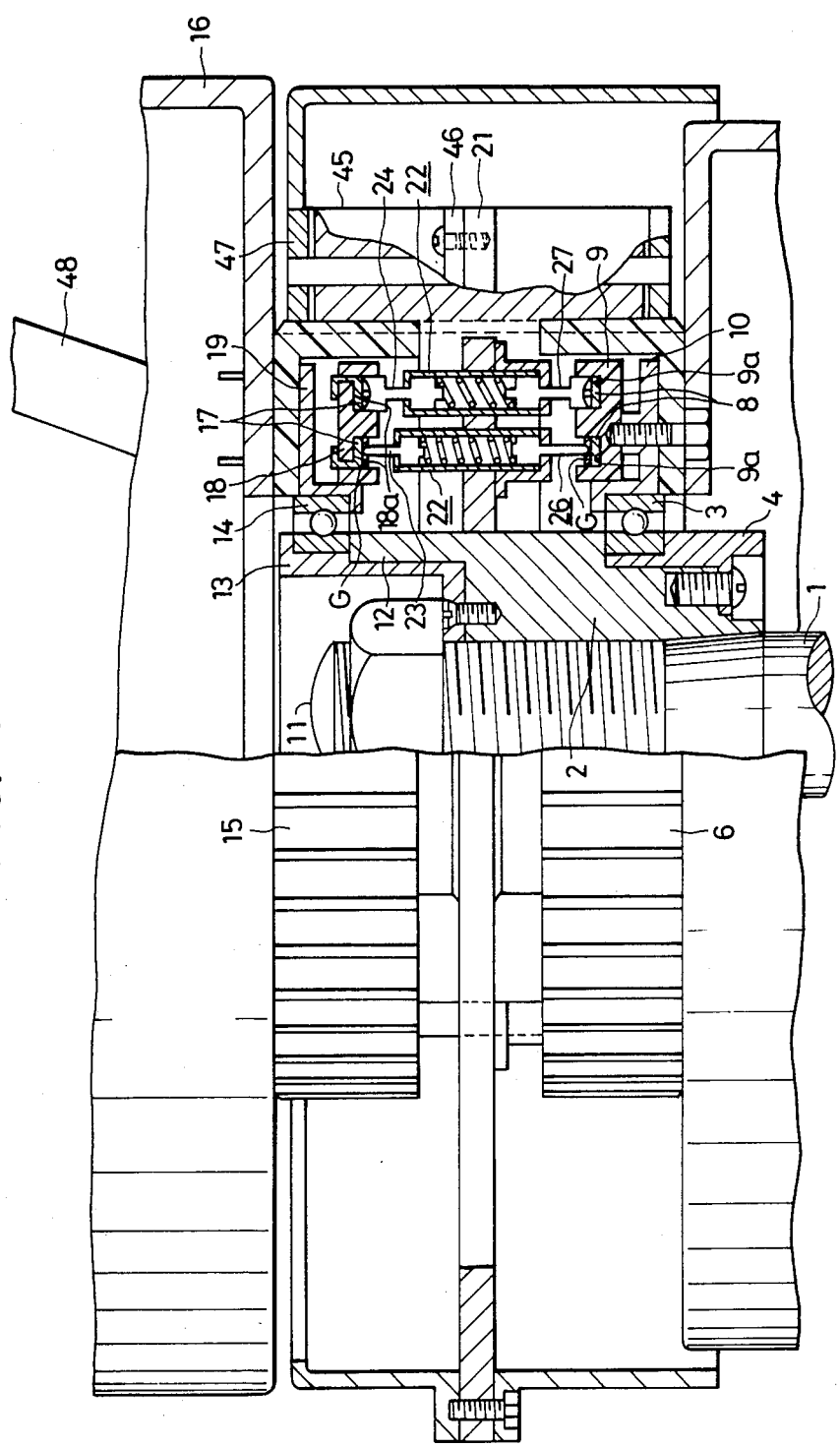
FIG. 7 is a partially broken side view of a steering wheel according to the second embodiment.

A second embodiment of the present invention will be described with reference to FIGS. 6-12, wherein like parts and components are designated by the same reference numerals and characters as those shown in the first embodiment. In the second embodiment, as shown in FIG. 7, two annular grooves 9a are formed in the lower plate support 9 formed of synthetic resisn and the slip rings 8 are fitted into the annular grooves 9a. Grease G having a given thickness as a lubricant is applied to the surfaces of slip rings 8 in the annular grooves 9a. Moreover, two annular grooves 18a are formed in the upper plastic plate support 18 formed of synthetic resin, and the slip rings 17 are fitted into the annular grooves 18a. Grease G having a given thickness as a lubricant is applied to the surfaces of the pad side slip rings 17. Cylindrical contact pin holders 22 are installed opposite to the pairs of pad side slip rings 17 and column side slip rings 8 on the boss plate 21. Two contact pin holders are provided for the respective slip rings 8, 17, and four contact pin holders in total (only one for each pair is shown in FIG. 7) are installed.

Figure 8:
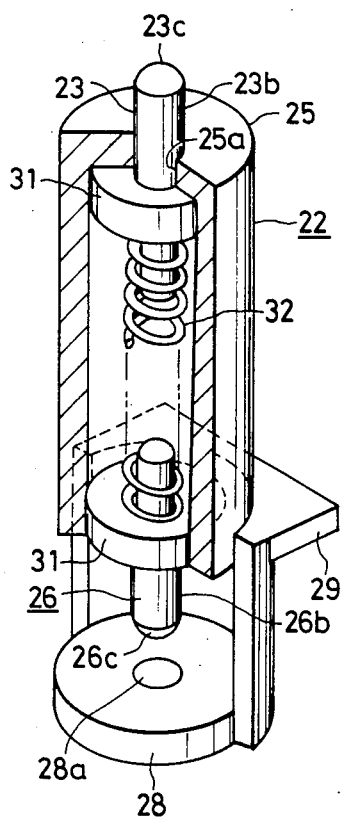
FIG. 8 is a partially broken perspective view of the first contact pin of FIG. 6.
Figure 9:
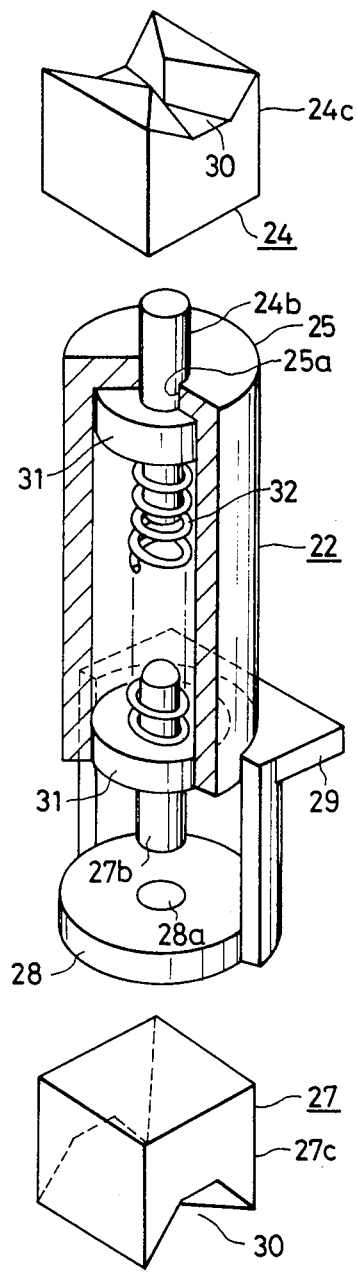
FIG. 9 is a partially borken perspective view of the second contact pin of FIG. 6.

As shown in FIGS. 8 and 9, the contact pin holders 22 include cylindrical bodies provided with top covers 25 having top holes 25a through which stem portions 23b, 24b of the first and second pad side contact pins 23, 24 can be passed, and bottom covers 28 having bottom holes 28a in their centers through which stem portions 26b, 27b of the column side contact pins 26, 27 can be passed, respectively. The contact pin holders 22 can be supported by the boss plates 21 by fixing the bottom covers 28 to the boss plates 21 through support bodies 29.

Figure 11:
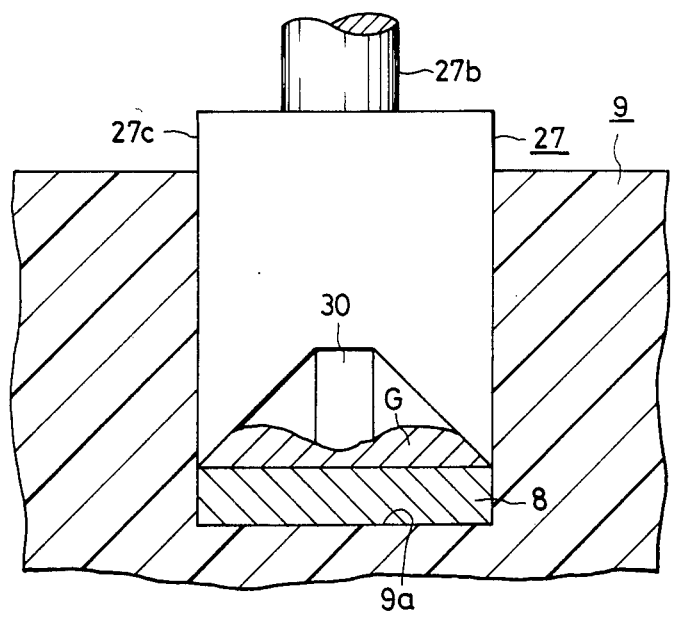
FIG. 11 is a partially broken elevational view indicative of the second contact pin fitted into the annular groove.
Figure 12:
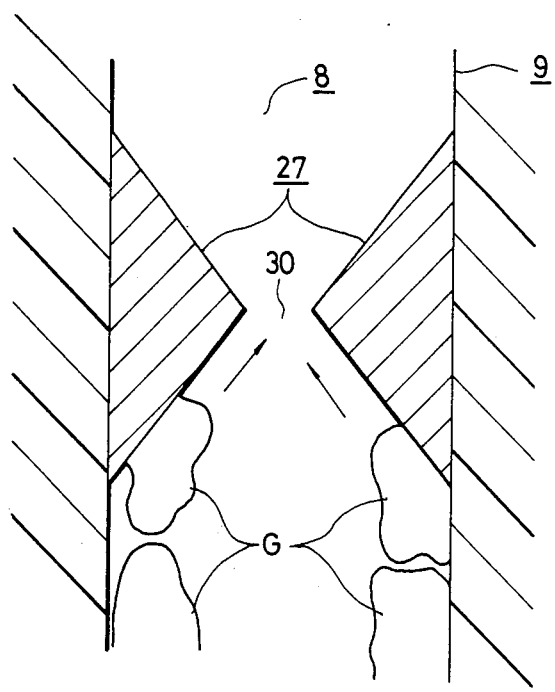
FIG. 12 is a sectional view of the principal portion of the second contact pin in operation.

As shown in FIG. 8, first roughly hemispherical contact means 23c, 26c are respectively attached to the tips of the stems 23b, 26b of the first pad and column side contact pins 23, 26, whereas second inverted-M-shaped contact means 24c, 27c in front view are, as shown in FIG. 9, respectively attached to the tips of the stems 24b, 27b of the second pad and column side contact pins 24, 27. The second contact means each having trapezoidal cuts 30 in their centers and widths approximately equal to the annular grooves 9a, 18a. The cuts 30 of the second contact means 24c, 27c are, as shown in FIGS. 9, 11 and 12, formed into a trapezoidal shape whose opening width is gradually decreased toward the center and serve for moving the grease G stuck to both edges of the slip rings 8, 17 to their centers of the slip rings 8, 17, during sliding contact of the contact pins 24, 27 with respect to the rings 17 and 8.

On the surfaces of the slip rings 8, 17, the first pad and column side contact pins 23, 26 employ their central portions as loci of circular sliding movement, whereas the second pad and column side contact pins 24, 27 use both their edge portions as loci of sliding movement, respectively.

Accordingly, as shown in FIGS. 8 and 9, one contact pin holder 22 equipped with the first contact pins 23, 26 each on the pad and column sides and another contact pin holder 22 provided with the second contact pins 24, 27 on the pad and column sides are installed between the pair of slip rings 8, 17. With respect to the radially inner rings 18a and 9a, two different types of holders 22 shown in FIGS. 8 and 9 are associated, and with respect to the radially outer rings 18a and 9a, the different types of holders are also associated as shown in FIG. 6.

The grease G scraped on the contact tracks of the first contact pins 23, 26 and driven toward radial edges of the surface of the slip rings 8, 17 is brought at the contact tracks of the second contact pins 24, 27. The grease is then driven out of the its own rotating track by the second contact pins 24, 27, so that the grease is again moved to the central portions with respect to each of the inner and outer rings.

A collar-like projection 31 is installed at a position offset from axial center of each of the support means 23b, 24b, 26b, 27b and contained in the contact pin holder 22 to prevent the contact pin 23, 24, 26 or 27 on the pad or column side from springing out of the contact holder 22.

Electrically conductive springs 32 are juxtaposed between the first and second pad side contact pins 23, 24 and the first and second column side contact pins 26, 27, respectively. The contact pins 23 and 26, 24 and 27 are urged by the springs 32 in the direction opposite to each other. Consequently, an electric signal sent out of the pad 16 side is sent to the first and second pad side contact pins 23, 24 through the pad side slip rings 17, and the signal is transmitted to the first and second column side contact pins 26, 27 through the springs 32. The signal is then sent to the bodies of electronic equipment (not shown) mounted on the column 13 through the column side slip rings 8.

Figure 10:
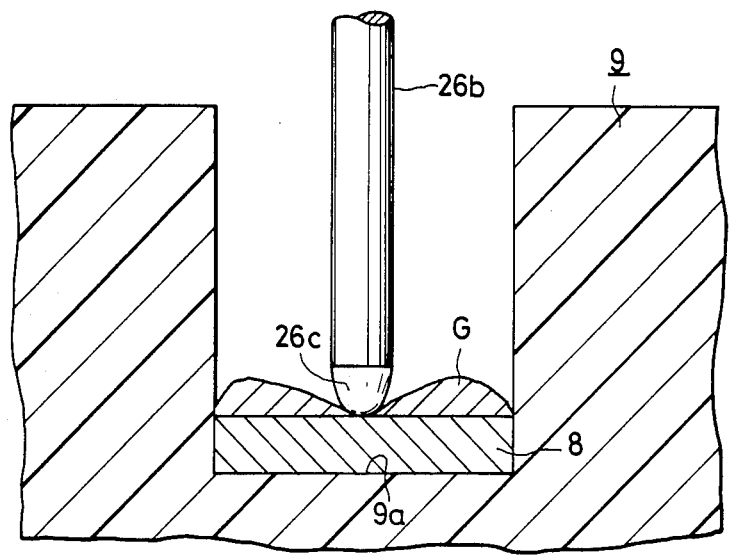
FIG. 10 is a partially broken elevational view indicative of the first contact pin fitted into an annular groove.

Referring to FIGS. 10-12, the operation of the steering wheel thus constructed and the effect thereof will be described.

When the ring means (not shown) is rotated so as to operate the steering wheel, the pad and column side planet gears 45 rotate on their axes and revolve around the pad and column side sun gears 15, 6, respectively in response to the rotation of the boss plate 21. Since the column side sun gear 6 is incapable of rotation relative to the column 5, the pad side sun gear 15 follows the column side sun gear 6 and is kept in a static state relative to the column 5. Accordingly, the pad is always maintained in a stationary state relative to the operation of the steering wheel.

Moreover, a voltage signal generated by the operation of switches installed on the pad 16 is sent to the bodies of electronic equipment through the pad side slip rings 17, the first and second pad side contact pins 23, 24, the springs 32, the first and second column side contact pins 26, 27 and the column side slip rings 8.

At that time, the pad and column side contact pins 23, 24, 26, 27 are rotated together with the boss plate 21 and incessantly contact the pad and column side slip rings 17, 8 while drawing the different loci of sliding revolutions, respectively. The grease G on the surfaces of the slip rings 8, 17 where the loci of sliding revolutions fall on is scraped off for a long period of use and driven out of the tracks. Ultimately, the grease G is running out.

On the contrary, the first and second contact pins 23, 24, 26, 27 are allowed to follow the different loci of sliding revolutions in the radial directions of the slip rings 8, 17 thereof and the grease G is carried to the different loci of sliding revolutions according to the present invention. In consequence, although the grease G on the loci of the first contact pins 23, 26 is driven onto the loci of sliding revolutions of the second contact pins 24, 27 as shown in FIG. 10, it is again driven by the second contact pins 24, 27 and carried onto the loci of the first contact pins 23, 26 as shown in FIGS. 11 and 12. Since this action is repeated, the grease G can always be kept applied on the loci of both contact pins 23, 24, 26, 27.

Accordingly, the grease G is prevented from running short on the contact loci of both contact pins 23, 24, 26, 27 and the slip rings 8, 17 are allowed to contact both contact pins 23, 24, 26, 27 smoothly. The generation of unusual sounds due to running out of grease G can be prevented.

Since the first and second contact pins 23, 24, 26, 27 are caused to contact both slip rings 8, 17 always through the grease G, it becomes possible to reduce the wear of them and the durability of the relay mechanism itself can be improved.

Moreover, the first and second contact pins 23, 24, 26, 27 are urged by the springs 32 in the direction of the slip rings 8, 17 in contact therewith and therefore the contact pins 23, 24, 26, 27 are capable of readily following up the surfaces of the slip rings 8, 17. Notwithstanding of sliding resistance between the slip rings 8, 17 and the first and second contact pins 23, 24, 26, 27, natural steering without a feeling of physical disorder is assured.

The applications of the present invention are not limited to the above embodiments and may be implemented in the following manners:

(1) The construction of the contact pin holder 22 may be made similar to that of a conventional holder shown in FIG. 2.

(2) In addition to electrically conductive grease, electrically conductive wax, electrically conductive oil, etc. may be used as a lubricant G.

(3) Various kinds of metal such as silver and copper and carbon may be used as an electrically conductive substance for the electrically conductive grease.

(4) Instead of the planet gear mechanism used according to this embodiment to render the pad unrotatable, more than one mating member may be used to couple the column and pad means as described in Japanese Patent Application No. 58-19471, or a spiral member may also be used to couple them together as described in Japanese Patent Application No. 58-152781.

(5) Two sets of planet gears may be used, in which one set of them is incorporated with a mechanism for suppressing a backlash.

(6) The fitting places of the first and second contact pins 23, 24, 26, 27 and the shapes of contact means 23c, 24c, 26c, 27c are not restricted in the embodiments described above, provided that their loci of sliding revolutions thereof are different from one another.

(7) The shapes of the contact means 24c, 27c of the second contact pins 24, 27 are not limited to those described in the above embodiment and any shapes allowing the grease G to be carried to the locus of first contact pins 23, 26 having their centers as the loci of sliding revolutions may be chosen for the purpose.

(8) The contact pins 23, 24, 26, 27 each may be insulated from the boss plate 21 and may directly be attached thereto.

(9) The fitting positions of the first contact pins 23, 26 and the second contact pins 24, 27 need not always be restricted but can be selected anywise.

(10) Although the present invention has been implemented in the form of a steering wheel provided with the pad unrotatable mechanism, it is also materialized with what has a pad rotatable type steering wheel conventionally adopted.

As described above, according to the present invention, the lubricant within the contact pin holder serves to reduce the wear resistance of the pad side contact pin and the column side contact pin with respect to the contact pin holder, and to promote the smooth movements of the contact pins.

Since the contact of the springs with the pad and column side contact pins can be smoothly maintained because of the lubricant, unpleasant sound which may be generated between the spring and the pins can be suppressed, and voltage drop can be reduced.

Further, according to the second embodiment, at least two contact pins kept in contact with one slip ring, and the locus of the sliding revolution of contact pins is different from each other in the radial direction thereof. Therefore, the reliability of the relay mechanism and the durability of the slip rings become improved.

According to the second embodiment of the present invention, in addition to the above effects, the preservation of a fixed quantity of lubricant always on the contacting tracks of the slip ring and the contact pins, since the lubricant applied to the slip ring can always be kept remaining on the loci of sliding revolutions of the opposite contact pins. In consequence, unusual sounds resulting from the lubricant running out can be prevented and at the same time the wear resistivity of the contact pins can also be increased.

We claim:

1. A steering wheel comprising:
   a pad portion;
   a column portion;
   a pad side unrotatable member;
   at least one pad side slip ring disposed below said pad side unrotatable member;
   a column side unrotatable member;
   at least one column side slip ring disposed above said column side unrotatable member;
   a boss plate positioned between said pad side and column side unrotatable members;
   at least one cylindrical contact pin holder fixedly secured to said boss plate;
   a pad side contact pin in sliding contact with said pad side slip ring, said pad side contact pin being slidingly supported in said contact pin holder;
   a column side contact pin in sliding contact with said column side slip ring, said column side contact pin being slidingly supported in said contact pin holder;
   a spring disposed in said contact pin holder and interposed between said pad and column side contact pins, and aligned linearly therewith; and
   a lubricant filled in said contact pin holder.

2. The steering wheel of claim 1, wherein said lubricant is an electrically conductive grease.

3. The steering wheel of claim 1, wherein said pad and column side contact pins are formed with an axial bore to allow said lubricant to seep from said contact pin holder to said slip rings.

4. A steering wheel comprising:
   a central boss;
   at least one slip ring disposed concentrically with said boss and electrically insulated from an outer surface of said boss;
   at least two contact pins in sliding contact with said slip rings, sliding loci of said contact pins with respect to said slip ring being different from each other in radial direction thereof.

5. The steering wheel of claim 4, wherein one of said contact pins has a sliding contact portion in contact with the central portion of said slip ring, and the other contact pin has sliding contact portions in contact with the portions adjacent inner and outer circumferential portions of said slip ring.

6. The steering wheel of claim 5 wherein said slip ring is coated with lubricant, said sliding contact portions of said contact pins moving said lubricant during their sliding movements over said slip ring.

* * * * *